2,969,049
ROTARY PISTON ENGINE

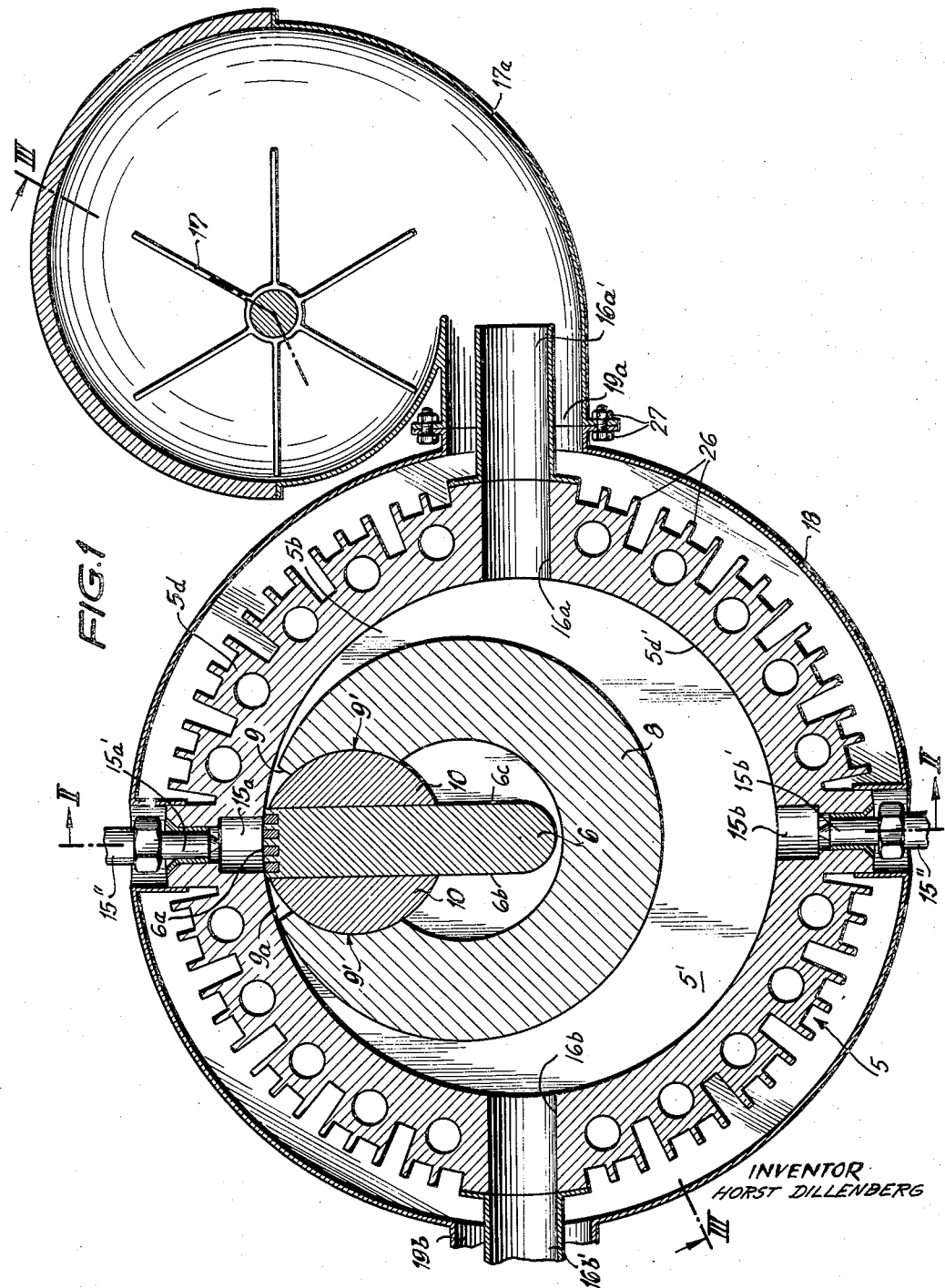

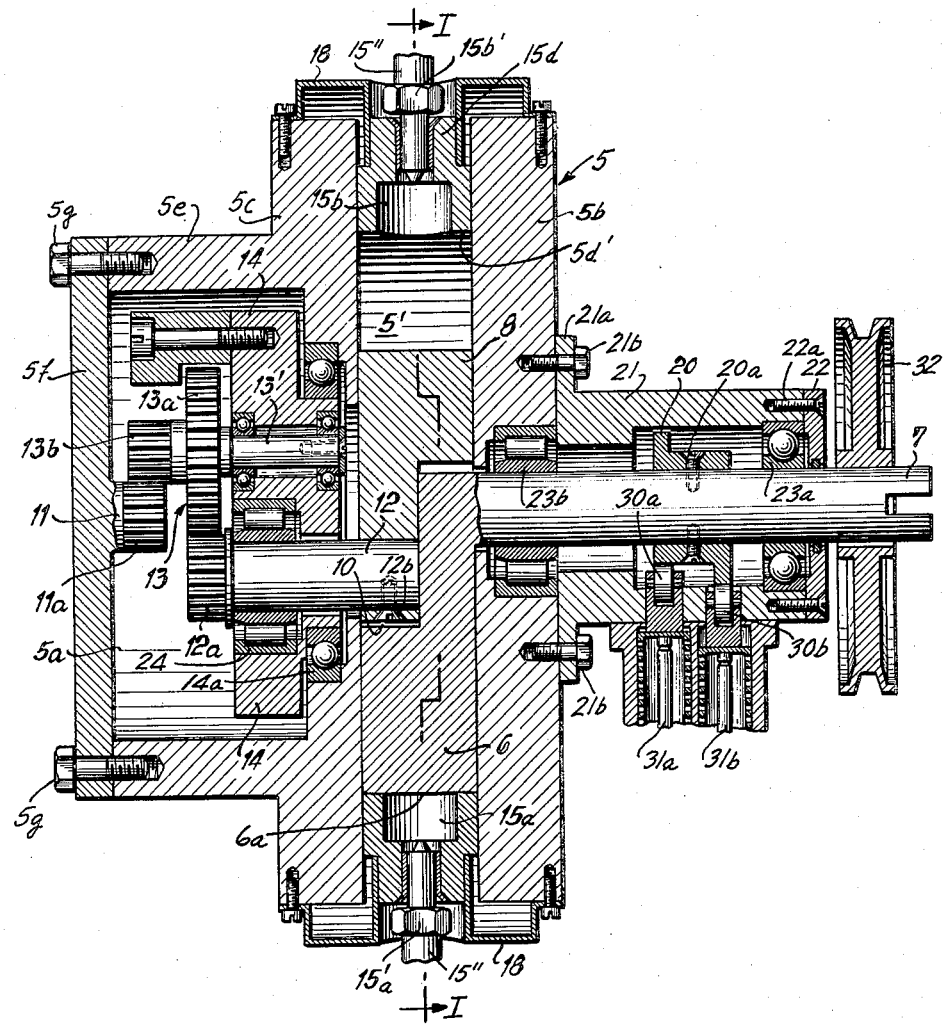

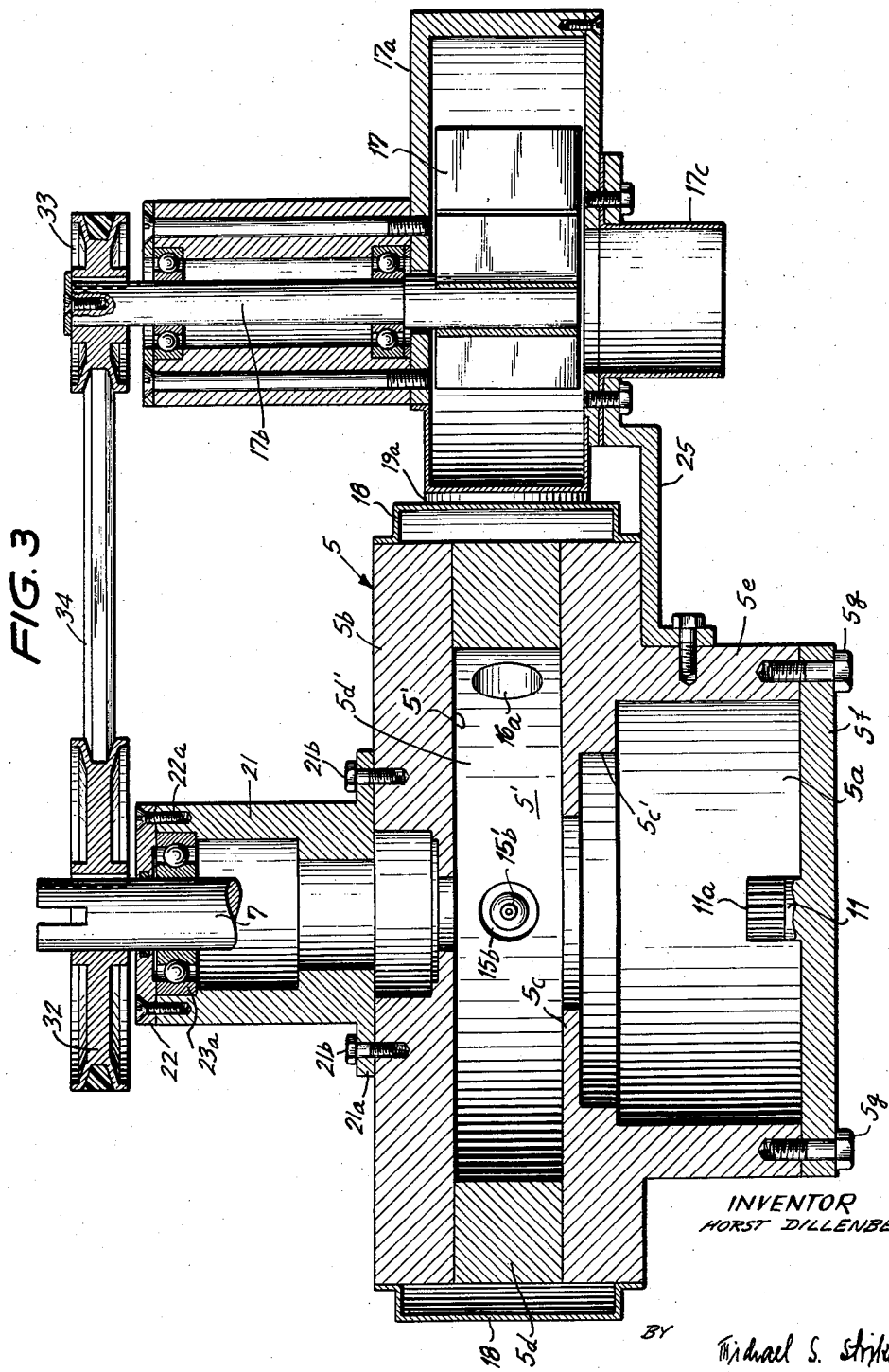

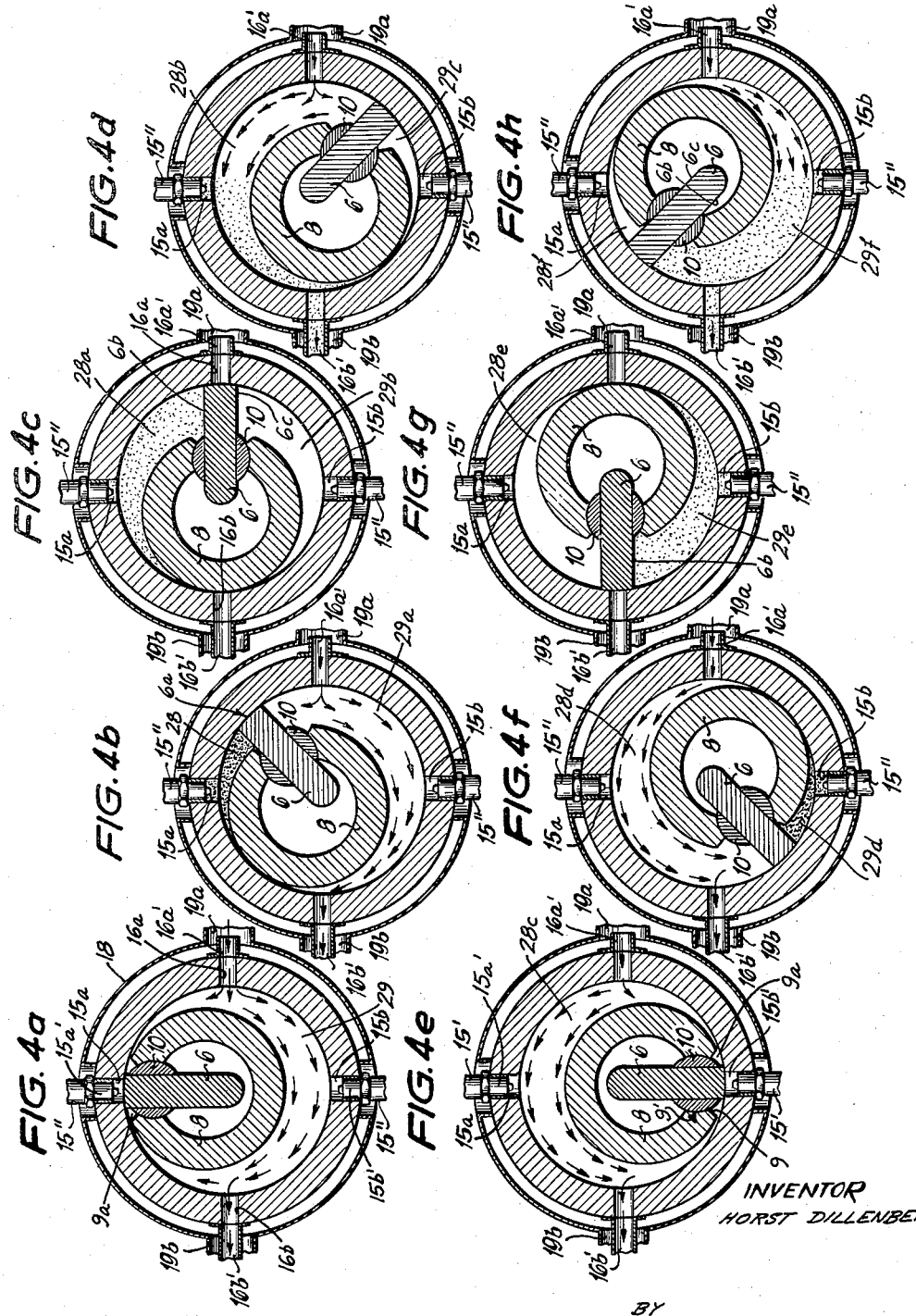

Horst Dillenberg, Wuppertal-Elberfeld, Germany
(Koniggratzer Strasse 25, Haan, Rhineland, Germany)

Filed Apr. 18, 1960, Ser. No. 22,852

20 Claims. (Cl. 123—8)

The present invention relates to internal combustion engines, and more particularly to an internal combustion engine comprising a rotary piston which is caused to revolve by the pressure of expanding gases developing upon combustion of fuel in the cylinder.

A great majority of presently utilized internal combustion engines operates with one or more pistons which are reciprocated by expanding gases and which are connected with a crankshaft by connecting rods adapted to transform reciprocatory movements into rotary movements. The maximum compression ratio of such reciprocating piston engines is determined by the design of bearings for the crankshaft, and all such engines invariably require a system of valves for controlling the flow of air and fuel into the combustion chamber.

It was already proposed to utilize the force of expanding combustion products for imparting movements to a rotary piston. However, the presently known engines which operate on such principle are too complicated and require an expensive and complex control system; therefore, such engines have failed to gain widespread acceptance.

An important object of the present invention is to provide a very simple and comparatively inexpensive rotary piston engine which is capable of producing high torque and which utilizes a minimal number of simple controls.

Another object of the invention is to provide a rotary piston engine of the just outlined characteristics which is constructed and assembled in such a way that all spent combustion products and the heated coolant may be collected in a very simple and efficient manner without any, or with only small thermal losses.

A further object of the invention is to provide an internal combustion engine of the above described type which does not require separate controls for the introduction of atmospheric air into the cylinder and wherein the flow of coolant, too, may be brought about without special controlling devices.

A concomitant object of the invention is to provide a rotary piston engine which is constructed and assembled in such a way that the rotary parts are subjected to comparatively low radial stresses and which, therefore, is capable of operating with very high compression ratios resulting in very satisfactory thermal efficiency and greater economy of operation.

With the above objects in view, the invention resides in the provision of a rotary piston engine which comprises essentially a cylinder, a radially extending piston which is mounted on the output shaft and which extends into the cylinder space, and a hollow cylindrical follower member which is eccentrically mounted on the piston and which not only participates in rotary movements of the piston but may also rotate with respect to the piston and may further move longitudinally of the piston in radial directions of the engine cylinder. The arrangement is preferably such that the follower member rotates in a direction counter to the direction in which the piston rotates and that the follower member completes two complete revolutions about an eccentric axis while the piston completes a single revolution about the axis of the output shaft. During such rotary movements, the follower member may but need not rub against the cylindrical inner surface which surrounds the cylinder space. Rotary movements of the follower member about the eccentric axis may be controlled by a suitable gear train which is mounted in a separate compartment defined by the cylinder and which preferably comprises a stationary gear coaxial with the cylinder and a rotary turntable which mounts an eccentric shaft rigidly connected with the follower member. The piston and the follower member divide the cylinder space into two zones one of which is the expansion zone for combustion products and the other of which is the compression zone for atmospheric air.

The cylinder is formed with diametrically opposed pairs of radial compression chambers and with diametrically opposed radial intake and discharge openings. The injection and ignition of fuel in the compression chambers occurs at such intervals that the expanding combustion products continuously drive the piston in the same direction whereby the piston and the follower member compress atmospheric air in one zone of the cylinder space toward and into one of the compression chambers, and simultaneously expel spent combustion products from the remaining portion or the second zone of the cylinder space. Alternately, the expulsion of spent combustion products may be brought about by a separate element which is connected with the follower member.

Another important feature of the invention resides in the provision of a cooling system for the improved engine which comprises a mantle surrounding the ribbed periphery of the cylinder and a fan which delivers atmospheric air into the mantle and which simultaneously delivers fresh air into the cylinder space. It is preferred to provide a single outlet pipe which collects the spent combustion products and the heated cooling air so that the fluid flowing through the outlet pipe may be conveyed with little or no losses to a thermal engine or the like.

The sole controls necessary for proper operation of my improved internal combustion engine regulate the flow of fuel and the exact timing of fuel injection into the compression chambers. Such controls may be operated by the output shaft of the engine which may also operate the cooling fan. The engine is preferably operated on the diesel principle, i.e. without spark plugs, but is equally useful for operation as an Otto engine.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Fig. 1 is a transverse section through the rotary piston engine as seen in the direction of arrows from the line I—I in Fig. 2;

Fig. 2 is an axial section through the engine taken along the line II—II of Fig. 1, as seen in the direction of arrows;

Fig. 3 is an axial section taken along the line III—III of Fig. 1, as seen in the direction of arrows, the rotary piston, the cylindrical follower member, and the gear train having been omitted for the sake of clarity; and Figs. 4a to 4h are smaller-scale transverse sections through the cylinder with the fan omitted, showing eight different angular positions of the piston and the follower member.

Referring now in greater detail to the illustrated embodiment, and first to Figs. 1 to 3, the rotary-piston engine comprises a comparatively short composite cylinder 5 which includes two substantially discoid components 5b, 5c and an annular component 5d therebetween. The components 5b—5d enclose a coaxial cylinder space 5'. The discoid component 5c has a coaxial annular hub 5e enclosing a cylindrical compartment 5a which communicates with the cylinder space 5' and is sealed by a discoid cover 5f fixed thereto by a series of screw bolts 5g.

The outer side of the discoid component 5b mounts a coaxial cylindrical extension 21 one end of which is formed with an external flange 21a fixed to the component 5b by a series of screw bolts 21b. The other end of the extension 21 is sealed by a discoid plate cover 22 which is fixed to said extension by a series of recessed screws 22a. The engine further comprises a rotary output shaft 7 which extends through the cover 22 and is rotatably mounted in antifriction bearings 23a, 23b provided in the extension 21 and in the discoid component 5b, respectively. That end of the output shaft 7 which extends into the cylinder space 5' is integrally formed with a rotary radial piston 6 of a configuration best shown in Figs. 1 and 2. The front face 6a of this piston is slidable along the cylindrical inner surface 5d' of the annular component 5d. The lateral faces 6b, 6c of the piston 6 are parallel with each other and with the axis of the output shaft 7 which latter is coaxial with the cylinder 5.

The piston 6 is coupled with a hollow cylindrical follower member 8 in a manner shown in Figs. 1 and 2. The axis about which this follower member may rotate is eccentric to the axis of the output shaft 7. The axially parallel slot or cutout 9a in the follower member 8 is bounded by a pair of short, substantially radial symmetrically arranged faces 9 and by a pair of symmetrically arranged concave faces 9'. Each concave face 9' is slidable about the arcuate peripheral surface of a substantially semicylindrical connecting or coupling element 10. The flat inner surfaces of connecting elements 10 abut against the lateral faces 6b, 6c of the piston 6 so that the elements 10 are slidable along the piston radially toward and away from the inner surface 5d' of the component 5d. In addition, the follower member 8 is rotatable about an eccentric second axis, i.e. about the connecting elements 10 and with respect to the piston 6. Thus, the follower member may perform a combined movement which consists of a rotary movement with the piston 6, of a translatory movement longitudinally of the piston 6, and of a rotary eccentric movement with respect to the piston.

The follower member 8 is connected with and controlled by a gear train 13 which is mounted in the compartment 5a. This gear train comprises a stub shaft 11 which is integral with and extends coaxially with the cylinder 5 from the inner side of the cover 5f. The stub shaft 11 is formed with a spur gear 11a which meshes with a companion gear 13b mounted on a shaft member 13' which is eccentrically mounted in a turntable 14. The turntable is rotatable in an antifriction bearing 14a coaxially mounted in a recess 5c' formed in the outer side of the discoid component 5c and mounts an eccentric shaft 12 one end of which is fixed to the follower member 8 by a recessed screw 12b. The shaft 12 is mounted in a roller bearing 24 and carries at its other end a spur gear 12 which meshes with a larger spur gear 13a on the shaft member 13'. The gear 13a is coaxial with the gear 13b. The gears 12a, 13a, 13b and 11a form the gear train 13 which causes the follower member 8 to revolve about the elements 10 and to roll along the inner surface 5d' of the component 5d in a direction counter to the direction in which the piston 6 rotates with the output shaft 7. When the piston 6 rotates, it entrains the follower member 8 and the latter is thereby guided and controlled by the gear train 13 in the compartment 5a in such a way that it always rolls along the inner surface 5d' and that it also rotates about the elements 10 in a direction opposed to the direction in which the piston 6 rotates. Of course, the rolling of follower member 8 along the surface 5d' is possible only because the semicylindrical coupling or connecting elements 10 permit movements of the follower member 8 longitudinally of the piston 6. By selecting the diameter of the gear 13a in such a way that its circumference is double the circumference of the gear 12a, and by utilizing gears 11a, 13b of equal diameters, the follower member 8 will perform two complete revolutions whenever the piston 6 performs a single revolution, i.e. the follower member 8 turns twice about the eccentric axis of elements 10 while the piston turns once about the axis of the output shaft 7. If the circumference of the follower member 8 equals one-half the circumference of the surface 5d', the member 8 will roll twice along the annular component 5d without any friction therebetween while the piston 6 completes a single revolution.

During such rolling movements of the follower member 8, the latter assumes twice a position in which its axis of rotation is located in the central symmetry plane of the radial piston 6, i.e. in a plane which is common to the axis of the output shaft 7. One such position of the follower member 8 is shown in Fig. 1. The analogous second position of the member 8 is shown in Fig. 4e; the follower member 8 assumes this second position when the piston 6 is rotated through 180 degrees from the position of Fig. 1 or 4a.

The annular component 5d is formed with two diametrically opposed preferably cylindrical compression chambers 15a, 15b which communicate with the cylinder space 5'. As is shown in Fig. 1, the axis about which the follower member 8 rotates is located in the symmetry plane of the piston 6 when the latter's front face 6a seals the compression chamber 15a from the cylinder space 5'. As may be observed in Figs. 1 and 2, the height and the width of the front face 6a exceed the diameters of compression chambers 15a and 15b so that the front face 6a completely seals these chambers from the space 5' when the piston 6 assumes the position of Fig. 1 (corresponding to its position shown in Fig. 4a) or the position of Fig. 4e. The annular component 5d further mounts fuel injection nozzles 15a', 15b' whose discharge ends extend into the compression chambers 15a, 15b, respectively. Each of these nozzles is connected with a conduit 15" leading to a source of fuel, not shown.

The annular component 5d also defines two diametrically opposed radial ducts 16a, 16b which communicate with flanged tubular members 16a', 16b' fixed to the outer side of the component 5d. The ducts 16a, 16b are turned through 90 degrees with respect to the compression chambers 15a, 15b. The height of ducts 16a, 16b preferably equals the height of the component 5d, i.e. these ducts extend from the discoid component 5b all the way to the discoid component 5c. The duct 16a constitutes an intake opening for fresh air which is blown into the tubular member 16a' by a fan 17 whose housing 17a is mounted on a bracket 25 carried by the hub 5e and is further supported by a sheet metal mantle 18 which is fixed to the discoid components 5b, 5c and surrounds the annular component 5d. The duct 16b serves as a discharge opening for spent gases and conveys the gases into the tubular member 16b'.

The periphery of the cylinder 5 is formed with heat radiating fins or ribs 26 which are surrounded by and inwardly spaced from the mantle 18 to be cooled by atmospheric air delivered by the fan 17 through a larger-diameter inlet pipe 19a surrounding the tubular member 16a' and communicating with the interior of the fan housing 17a. As is shown in Fig. 1, the inlet pipe 19a and the mantle 18 are formed with abutting external flanges connected to each other by bolts and nuts 27. Spent air may be discharged from the mantle 18 through an outlet pipe 19b which coaxially surrounds the tubular member 16b'. It will be seen that the inlet pipe 19a delivers cooling air not only to the interior of the mantle 18 but also to the intake opening 16a, and that the outlet pipe 19b may receive spent air from the interior of the mantle 18 as well as spent gases passing through the tubular member 16b'. Such arrangement is of considerable advantage because the spent gases and heated cooling air may be delivered to a thermal engine by a single conduit, i.e. through the outlet pipe 19b.

The engine operates as follows:

In Fig. 4a, the piston 6 assumes the position of Fig. 1 in which its front face 6a seals the compression chamber 15a from the cylinder space 5'. It is assumed that the engine operates on the diesel principle, i.e. that the fuel is ignited because of high compression in the chamber 15a or 15b. When the chamber 15a is sealed from the space 5', the degree of compression of air in the compression chamber 15a reaches its maximum value. Fuel is injected when the piston 6 moves a short distance from the position of Fig. 4a, i.e. when the left-hand portion of the slot 9a in the cylindrical follower member 8 communicates with the compression chamber 15a. The fuel injected by nozzle 15a' is ignited automatically because of high compression temperatures prevailing in the chamber 15a. The combustion of fuel brings about a rise in temperatures and pressures prevailing in the chamber 15a and in the left-hand portion of slot 9a, and the gases expanding in the chamber 15 and slot 9a cause a rotation of the piston 6 in clockwise direction. After moving through an angle of 45 degrees, the piston 6 assumes the position of Fig. 4b. The portion or zone 28 of cylinder space 5' which is filled by expanding combustion products increases as the piston moves from the position of Fig. 4a toward and beyond the position of Fig. 4b. Simultaneously with such rise in the volume of zone 28, the area of that portion of the lateral piston face 6b which is exposed to the action of expanding gases in the zone 28 is also increased because the connecting elements 10 and the follower member 8 move in a direction toward the output shaft 7, i.e. along the lateral faces 6b, 6c of the piston 6 and toward the axis of the cylinder 5. In addition, that portion of the periphery of the follower member 8 which is exposed to the action of expanding gases in the zone 28 also increases, and the follower member 8 simultaneously performs a rolling movement about the elements 10 and along the inner surface 5d' of the annular component 5d. The volume of zone 28 increases still further as the piston 6 continues its rotary movement toward and into the position of Fig. 4c (see the zone 28a) in which its front face 6a moves along the intake opening 16a. The pressure of combustion products in the zone 28 or 28a drops proportionally with the increasing volume of said zone; however, the area of the lateral piston face 6b in the zone 28 or 28a also increases and, consequently, the total force which tends to rotate the piston 6 in clockwise direction remains substantially the same.

While the piston 6 advances from the position of Fig. 4a toward the position of Fig 4c, the fan 17 delivers atmospheric air through the intake opening 16a and into the remaining portion or zone 29 of the cylinder space 5'. Up to the time when the piston 6 reaches the position of Fig. 4c, the air entering through the intake opening 16a is free to flow toward and through the discharge opening 16b to thereby flush out spent gases from the zone 29. Thus, when the piston reaches the position of Fig. 4c, the zone 29 is filled with fresh air and the follower member 8 then seals the discharge opening 16b from the zone 29. As the piston 6 continues its rotary movement into the position of Figs. 4d and 4e, fresh air in the zone 29 becomes compressed and is finally forced into the second compression chamber 15b (see Fig. 4e). At the same time, fresh air flowing through the intake opening 16a expels spent gases from the progressively increasing zone 28b, 28c because the follower member now permits communication between the discharge opening 16b and the zone 28b, 28c. The second nozzle 15b' injects fuel into the chamber 15b as soon as the piston 6 moves slightly beyond the position of Fig. 4e whereby the expanding combustion products in the now progressively increasing zone 29d force the piston to move over the positions of Figs. 4f, 4g and 4h back into the position of Fig. 4a. As the piston completes a full revolution, the volume of the zone 28 progressively increases from zero (Fig. 4a) to its maximum value 28c (Fig. 4e) during the first half revolution of the piston. During the first fourth of a revolution, the zone 28, 28a contains only combustion products; during the second and third fourths of the same revolution, the zone 28b, 28c, 28d is aerated; and during the last fourth of the revolution the piston 6 and the follower member 8 compress fresh air in the zone 28e, 28f to the point (Fig. 4a) when the volume of zone 28 is reduced to zero because the compressed air is now entrapped solely in the chamber 15a. The volume of the other zone 29 decreases from its maximum magnitude in Fig. 4a to zero magnitude in Fig. 4e (see the decreasing intermediate zones 29a, 29b, 29c in Figs. 4b, 4c, 4d, respectively), and then begins to increase to its maximum magnitude of Fig. 4a (see the increasing zones 29d, 29e, 29f in Figs. 4f, 4g, 4h, respectively). The piston 6, the hollow cylindrical follower member 8, and the coupling or connecting elements 10 completely seal the zone 28 from the zone 29 of the cylinder space 5'.

In Figs. 4a to 4h, the flow of fresh air in zones 28, 29 of the cylinder space 5' is indicated by small arrows while the dotted areas indicate zones filled with combustion products.

It will be noted that the improved engine may operate without utilizing any valves for the introduction of fresh air and for the discharge of spent gases. In addition, fresh air circulated by a single fan 17 is utilized for expulsion of spent gases and for simultaneous external cooling of the cylinder 5. During each revolution of the piston 6, the engine performs two power strokes.

Only the timing of fuel injection into the compression chambers 15a, 15b requires regulation. As is shown in Fig. 2, the operation of nozzles 15a', 15b' may be controlled by a system of cams and followers mounted in the cylindrical extension 21 of the component 5b. A twin cam 20 is fixed to the output shaft 7 by a series of screws 20a to operate two roller followers 30a, 30b in such manner that these followers cause the piston rods 31a, 31b to alternately perform fuel delivery strokes during each half revolution of the shaft 7. The plunger (not shown) which is connected to the rod 31a delivers a controlled quantity of fuel to the upper supply conduit 15" and into the nozzle 15a', and the plunger connected with the rod 31b delivers fuel to the lower supply conduit 15" and to the nozzle 15b'.

The fan 17 is rotated by a driving pulley 32 on the shaft 7, by a driven pulley 33 on the fan shaft 17b, and by an endless V-belt 34. The fan housing 17a is formed with an air intake 17c.

It will be readily understood that the improved engine may be adapted to operate as an Otto engine by the provision of suitable carburetor and spark plug assemblies. However, when operated as a Diesel engine, the engine of my invention is more economical because it can achieve maximum thermal efficiency. Since the engine operates without crankshafts, it can achieve very high compression ratios because the degree of compression is not limited by the permissible stresses upon crankshaft bearings or the like. The operation of the engine is very smooth because the piston has no dead center positions and, since the engine performs two power strokes during each revolution, it can achieve a comparatively high torque.

It is further possible to combine the follower member 8 with a second rotary piston which expels spent gases from the cylinder.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a rotary piston engine of the character described, in combination, a cylinder defining a coaxial cylinder space and having a cylindrical inner surface bounding said space; a radial piston in said space adapted to be rotated about the axis of said cylinder; a cylindrical follower member coupled with said piston for rotary movement about the axis of said cylinder and rotatable with respect to said piston about a second axis parallel with the axis of said cylinder; and means connected with said follower member for rotating the same in clockwise direction about said second axis and along said cylindrical surface when the piston rotates in anticlockwise direction, and vice versa.

2. In a rotary piston engine of the character described, in combination, a cylinder defining a coaxial cylinder space and having a cylindrical inner surface bounding said space; a radial piston in said space adapted to be rotated about the axis of said cylinder; a cylindrical follower member coupled with said piston for rotary movement about the axis of said cylinder and rotatable with respect to said piston about a second axis parallel with the axis of said cylinder; and means connected with said follower member for rotating the same in clockwise direction about said second axis and along said cylindrical surface when the piston rotates in anticlockwise direction, and vice versa, the follower member completing two revolutions about said second axis during each complete revolution of said piston about the axis of said cylinder.

3. In a rotary piston engine of the character described, in combination, a cylinder defining a coaxial cylinder space and having a cylindrical inner surface bounding said space; a radial piston in said space adapted to be rotated about the axis of said cylinder; a cylindrical follower member coupled with said piston for rotary movement about the axis of said cylinder and rotatable with respect to said piston about a second axis parallel with the axis of said cylinder; and means connected with said follower member for rotating the same in clockwise direction about said second axis and along said cylindrical surface when the piston rotates in anticlockwise direction, and vice versa, the follower member completing two revolutions about said second axis and sliding along said cylindrical surface during each complete revolution of said piston about the axis of said cylinder.

4. In a rotary piston engine of the character described, in combination, a cylinder defining a coaxial cylinder space and having a cylindrical inner surface bounding said space; a radial piston in said space adapted to be rotated about the axis of said cylinder, said piston having a front face slidable along said cylindrical surface and two lateral faces parallel with each other and with the axis of said cylinder; a cylindrical follower member coupled with said piston for rotary movement about the axis of said cylinder and rotatable with respect to said piston about a second axis parallel with the axis of said cylinder, said follower member having an axially parallel slot and a pair of symmetrically arranged concave faces in said slot; two semicylindrical connecting elements both received in said slot and defining said second axis, each of said connecting elements having a flat surface slidable along one of said lateral faces and an arcuate peripheral surface slidable along one of said concave faces whereby the follower member is slidable with said connecting elements radially along said piston and is rotatable about said connecting elements; and means connected with said follower member for rotating the same in clockwise direction about said connecting elements and along said cylindrical surface when the piston rotates in anticlockwise direction, and vice versa.

5. In a rotary piston engine of the character described, in combination, a cylinder defining a coaxial cylinder space and having a cylindrical inner surface bounding said space; a radial piston in said space adapted to be rotated about the axis of said cylinder; a hollow cylindrical follower member coupled with said piston for rotary movement about the axis of said cylinder and rotatable with respect to said piston about a second axis parallel with the axis of said cylinder; and means coupled with said follower member for rotating the same in clockwise direction about said second axis and along said cylindrical surface when the piston rotates in anticlockwise direction, and vice versa, said rotating means comprising a gear train including a stationary gear coaxial with said cylinder.

6. In a rotary piston engine of the character described, in combination, a cylinder defining a coaxial cylinder space, a compartment adjacent to said space, and having a cylindrical inner surface bounding said space; a radial piston in said space adapted to be rotated about the axis of said cylinder; a hollow cylindrical follower member coupled with said piston for rotary movement about the axis of said cylinder and rotatable with respect to said piston about a second axis parallel with the axis of said cylinder; and means mounted in said compartment and coupled with said follower member for rotating the same in clockwise direction about said second axis and along said cylindrical surface when the piston rotates in anticlockwise direction, and vice versa, said rotating means comprising a gear train including a stationary gear coaxial with said cylinder.

7. In a rotary piston engine of the character described, in combination, a cylinder defining a coaxial space and a compartment adjacent to said space, said cylinder having a cylindrical inner surface surrounding said space; a radial piston in said space adapted to be rotated about the axis of said cylinder; a hollow cylindrical follower member coupled with said piston for rotary movement about the axis of said cylinder and rotatable with respect to said piston about a second axis parallel with the axis of said cylinder; and means mounted in said compartment and coupled with said follower member for rotating the same in clockwise direction about said second axis and along said cylindrical surface when the piston rotates in anticlockwise direction, and vice versa, said rotating means comprising a stationary shaft coaxial with said cylinder, a second shaft connected to said follower member and eccentric with respect to the axis of said cylinder, and a gear train including a first gear on said stationary shaft and a second gear on said second shaft.

8. In a rotary piston engine of the character described, in combination, a cylinder defining a coaxial cylinder space and a compartment adjacent to said space, said cylinder having a cylindrical inner surface surrounding said space; a radial piston in said space adapted to be rotated about the axis of said cylinder; a hollow cylindrical follower member coupled with said piston for rotary movement about the axis of said cylinder and rotatable with respect to said piston about a second axis parallel with the axis of said cylinder; and means mounted in said compartment and coupled with said follower member for rotating the same in clockwise direction about said second axis and along said cylindrical surface when the piston rotates in anticlockwise direction, and vice versa, said rotating means comprising a stationary shaft coaxial with said cylinder, a second shaft parallel with said stationary shaft and connected with said follower member, said second shaft eccentric with respect to the axis of said cylinder, a turntable mounted in said compartment for rotation about the axis of said cylinder and rotatably mounting said second shaft, a shaft member rotatably mounted in said turntable and parallel with said stationary shaft, and a gear train including a first gear mounted on said stationary shaft, a second gear mounted on said second shaft, a third gear mounted on said shaft member and meshing with said first gear, and a fourth gear mounted on said shaft member and meshing with said second gear.

9. In a rotary piston engine of the character described, in combination, a cylinder defining a coaxial cylinder space and a compartment adjacent to said space, said cylinder having a cylindrical inner surface surrounding said space; a radial piston in said space adapted to be rotated about the axis of said cylinder; a hollow cylindrical follower member coupled with said piston for rotary movement about the axis of said cylinder and rotatable with respect to said piston about a second axis parallel with the axis of said cylinder; and means mounted in said compartment and coupled with said follower member for rotating the same in clockwise direction about said second axis and along said cylindrical surface when the piston rotates in anticlockwise direction, and vice versa, said rotating means comprising a stationary shaft coaxial with said cylinder, a second shaft parallel with said stationary shaft and connected with said follower member, said second shaft eccentric with respect to the axis of said cylinder, a turntable mounted in said compartment for rotation about the axis of said cylinder and rotatably mounting said second shaft, a shaft member rotatably mounted in said turntable and parallel with said stationary shaft, and a gear train including a first gear mounted on said stationary shaft, a second gear mounted on said second shaft, a third gear mounted on said shaft member and meshing with said first gear, the diameter of said third gear equal to the diameter of said first gear, and a fourth gear mounted on said shaft member and meshing with said second gear, the circumference of said second gear equal to one half the circumference of said fourth gear.

10. In a rotary piston engine of the character described, in combination, a cylinder defining a coaxial cylinder space and a pair of diametrically opposed compression chambers extending radially of and communicating with said space, said cylinder having a cylindrical inner surface surrounding said space; a radial piston in said space adapted to be rotated about the axis of said cylinder, said piston having a symmetry plane radial with respect to and intersecting the axis of said cylinder, and front face slidable along said cylindrical surface; a hollow cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; and means connected with said follower member for rotating the same in clockwise direction about said second axis and along said cylindrical surface when the piston rotates in anticlockwise direction, and vice versa.

11. In a rotary piston engine of the character described, in combination, a cylinder defining a coaxial cylinder space and a pair of diametrically opposed compression chambers extending radially of and communicating with said space, said cylinder having a cylindrical inner surface surrounding said space; a radial piston in said space adapted to be rotated about the axis of said cylinder, said piston having a symmetry plane radial with respect to and intersecting the axis of said cylinder, and a front face slidable along said cylindrical surface, the area of said front face exceeding the cross-sectional areas of said compression chambers; a hollow cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; and means connected with said follower member for rotating the same in clockwise direction about said second axis and along said cylindrical surface when the piston rotates in anticlockwise direction, and vice versa.

12. In a rotary piston engine of the character described, in combination, a cylinder defining a coaxial cylinder space and a pair of diametrically opposed compression chambers extending radially of and communicating with said space, said cylinder having a cylindrical inner surface surrounding said space; a fuel injection nozzle mounted in each of said chambers; a radial piston in said space adapted to be rotated about the axis of said cylinder, said piston having a symmetry plane radial with respect to and intersecting the axis of said cylinder, and a front face slidable along said cylindrical surface; a hollow cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; and means connected with said follower member for rotating the same in clockwise direction about said second axis and along said cylindrical surface when the piston rotates in anticlockwise direction, and vice versa.

13. In a rotary piston engine of the character described, in combination, a cylinder defining a coaxial cylinder space, a pair of diametrically opposed compression chambers extending radially of and communicating with said cylinder space, a pair of opposed openings communicating with said cylinder space, and having a cylindrical inner surface surrounding said space; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; and means for blowing atmospheric air through one of said openings, the other of said openings constituting a discharge opening for permitting discharge of gases from said space.

14. In a rotary piston engine of the character described, in combination, a cylinder defining a coaxial cylinder space, a pair of diametrically opposed compression chambers extending radially of and communicating with said cylinder space, and a pair of diametrically opposed radial openings communicating with said cylinder space and turned through 90 degrees with respect to said compression chambers, said cylinder having a cylindrical inner surface surrounding said space; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; and means for blowing atmospheric air through one of said openings, the other of said openings constituting a discharge opening for permitting discharge of gases from said space.

15. In a rotary piston engine of the character described, in combination, a cylinder defining a coaxial cylinder space, a pair of diametrically opposed compression chambers extending radially of and communicating with said cylinder space and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; a mantle surrounding the periphery of said cylinder and spaced from said ribs, said mantle having inlet and outlet pipe means; and fan means for blowing atmospheric air into the inlet pipe means of said mantle and through one of said openings, the other of said openings constituting a discharge opening for permitting discharge of gases from said cylinder space.

16. In a rotary piston engine of the character described, in combination, a cylinder defining a coaxial cylinder space, a pair of diametrically opposed compression chambers extending radially of and communicating with said cylinder space, and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anti-clockwise direction, and vice versa; a mantle surrounding the periphery of said cylinder, said mantle having an inlet pipe and an outlet pipe; and means for blowing atmospheric air through said inlet pipe and through one of said openings, the other of said openings communicating with said outlet pipe and constituting a discharge opening for permitting discharge of gases from said space.

17. In a rotary piston engine of the character described, in combination, a cylinder defining a coaxial cylinder space, a pair of diametrically opposed compression chambers extending radially of and communicating with said cylinder space and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; an output shaft connected with said piston and coaxially extending from said cylinder; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; a mantle surrounding the periphery of said cylinder and spaced from said ribs, said mantle having inlet and outlet pipe means; fan means for blowing atmospheric air into the inlet pipe means of said mantle and through one of said openings, the other of said openings constituting a discharge opening for permitting discharge of gases from said cylinder space; and means connected with said output shaft for operating said fan means.

18. In a rotary piston engine of the character described, in combination, a cylinder defining a coaxial cylinder space, a pair of diametrically opposed compression chambers extending radially of and communicating with said cylinder space and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; an output shaft integral with said piston and coaxially extending from said cylinder; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; a mantle surrounding the periphery of said cylinder and spaced from said ribs, said mantle having inlet and outlet pipe means; and fan means operatively connected with and adapted to be driven by said output shaft for blowing atmospheric air into the inlet pipe means of said mantle and through one of said openings, the other of said openings constituting a discharge opening for permitting discharge of gases from said cylinder space.

19. In a rotary piston engine of the character described, in combination, a cylinder defining a coaxial cylinder space, a pair of diametrically opposed compression chambers extending radially of and communicating with said cylinder space and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member coupled with said piston for rotary movement about the axis of said cylinder and rotatable with respect to said piston about a second axis parallel with the axis of said cylinder, said second axis located in the symmetry plane of said piston when the front face of said piston is adjacent to and seals one of said compression chambers from said space; means connected with said follower member for rotating the same in clockwise direction about said second axis and along said cylindrical surface when the piston rotates in anticlockwise direction, and vice versa; a mantle surrounding the periphery of said cylinder and spaced from said ribs, said mantle having inlet and outlet pipe means each surrounding and communicating with one of said openings; and fan means for blowing atmospheric air into the inlet pipe means of said mantle and through one of said openings, the other of said openings constituting a discharge opening for permitting discharge of gases from said cylinder space.

20. In a rotary piston engine of the character described, in combination, a cylinder defining a coaxial cylinder space, a pair of diametrically opposed compression chambers extending radially of and communicating with said cylinder space and a pair of diametrically opposed radial openings communicating with said cylinder space and turned through 90 degrees with respect to said compression chambers, said cylinder having a cylindrical inner surface surrounding said space and a periphery formed with cooling ribs; a fuel injection nozzle mounted in each of said compression chambers; a radial piston in said space adapted to be rotated about the axis of said cylinder, said piston having a symmetry plane radial with respect to and intersecting the axis of said cylinder, and a front face slidable along said cylindrical surface; a cylindrical follower member; means coupling said follower member with said piston for rotary movement about the axis of said cylinder and for rotation with respect to said piston about a second axis parallel with the axis of said cylinder, said second axis located in the symmetry plane of said piston when the front face of said piston is adjacent to and seals one of said compression chambers from said space, said piston, said follower member and said coupling means sealingly dividing said space into a first and a second zone; means connected with said follower member for rotating the same in clockwise direction about said second axis and along said cylindrical surface when the piston rotates in anticlockwise direction, and vice versa; a mantle surrounding the periphery of said cylinder and spaced from said ribs, said mantle having inlet and outlet pipe means; and fan means for blowing atmospheric air into the inlet pipe means of said mantle and through one of said openings, the other of said openings constituting a discharge opening for permitting discharge of gases from said cylinder space.

No references cited.